(12) United States Patent
Ahn

(10) Patent No.: US 10,630,469 B2
(45) Date of Patent: Apr. 21, 2020

(54) MOBILE DEVICE HAVING QUANTUM CRYPTOGRAPHIC SECURITY FUNCTION FOR MOBILE COMMERCE, AND AUTHENTICATION METHOD

(71) Applicant: University of Seoul Industry Cooperation Foundation, Seoul (KR)

(72) Inventor: Do Yeol Ahn, Seoul (KR)

(73) Assignee: University of Seoul Industry Cooperation Foundation, Seoul (KR)

( * ) Notice: Subject to any disclaimer, the term of this patent is extended or adjusted under 35 U.S.C. 154(b) by 175 days.

(21) Appl. No.: 15/655,420

(22) Filed: Jul. 20, 2017

(65) Prior Publication Data

US 2017/0324552 A1 Nov. 9, 2017

Related U.S. Application Data

(63) Continuation of application No. PCT/KR2016/000765, filed on Jan. 25, 2016.

(30) Foreign Application Priority Data

Jan. 23, 2015 (KR) .................. 10-2015-0011344

(51) Int. Cl.
*H04L 9/08* (2006.01)
*H04B 10/70* (2013.01)
(Continued)

(52) U.S. Cl.
CPC ......... *H04L 9/0852* (2013.01); *G06Q 20/382* (2013.01); *G06Q 20/401* (2013.01);
(Continued)

(58) Field of Classification Search
CPC .............................. H04L 9/0852; H04B 10/70
(Continued)

(56) References Cited

U.S. PATENT DOCUMENTS

| 7,734,049 B2 | 6/2010 | Niemi et al. |
| 7,899,183 B2 | 3/2011 | Tajima et al. |

(Continued)

FOREIGN PATENT DOCUMENTS

| JP | 2005-217676 A | 8/2005 |
| JP | 2006-203559 A | 8/2006 |

(Continued)

OTHER PUBLICATIONS

Kim, Jae-Wan, "Quantum Cryptography", Korea Institute of Information Security and Cryptology, 14(3), 8-12, English Abstract. Jun. 2004, 7 pages.

(Continued)

*Primary Examiner* — Bryan F Wright
(74) *Attorney, Agent, or Firm* — Nelson Mullins Riley & Scarborough LLP; Kongsik Kim

(57) ABSTRACT

Disclosed herein are technologies regarding a communication device and server which are capable of cryptographic communication based on quantum cryptography. The communication device includes: a quantum signal generation unit configured to generate a series of first quantum signals by using a first quantum filter; an optical transmission unit configured to send the series of first quantum signals to a server; and a processor configured to select the first quantum filter based on a series of randomly generated first quantum states, and to control the quantum signal generation unit to generate the series of first quantum signals by using the first quantum filter.

16 Claims, 12 Drawing Sheets

(51) Int. Cl.
    *G06Q 20/38*     (2012.01)
    *H04L 9/06*     (2006.01)
    *G06Q 20/40*     (2012.01)
    *H04L 9/14*     (2006.01)
    *H04L 9/32*     (2006.01)

(52) U.S. Cl.
    CPC ........... *H04B 10/70* (2013.01); *H04L 9/0662* (2013.01); *H04L 9/0855* (2013.01); *H04L 9/0858* (2013.01); *H04L 9/0872* (2013.01); *H04L 9/14* (2013.01); *H04L 9/3226* (2013.01); *H04L 2209/80* (2013.01)

(58) Field of Classification Search
    USPC ......................................................... 380/256
    See application file for complete search history.

(56) References Cited

U.S. PATENT DOCUMENTS

| | | | |
|---|---|---|---|
| 8,600,051 | B2 | 12/2013 | Noh |
| 8,650,401 | B2 | 2/2014 | Wiseman et al. |
| 8,781,129 | B2 | 7/2014 | Bush et al. |
| 8,855,316 | B2 | 10/2014 | Wiseman et al. |
| 9,246,602 | B2 | 1/2016 | Ukita et al. |
| 2004/0120527 | A1 | 6/2004 | Hawkes et al. |
| 2006/0120529 | A1* | 6/2006 | Gisin .................... H04L 9/0852 380/256 |
| 2011/0126011 | A1* | 5/2011 | Choi .................... H04L 9/0852 713/168 |
| 2011/0142242 | A1 | 6/2011 | Tanaka |
| 2011/0231665 | A1 | 9/2011 | Wiseman |
| 2012/0177201 | A1* | 7/2012 | Ayling .................... H04B 10/70 380/278 |
| 2013/0251145 | A1 | 9/2013 | Lowans et al. |
| 2015/0172048 | A1* | 6/2015 | Wabnig .................. H04B 10/70 380/256 |
| 2015/0326391 | A1 | 11/2015 | Cho et al. |
| 2016/0127127 | A1* | 5/2016 | Zhao .................... H04L 9/0852 713/171 |

FOREIGN PATENT DOCUMENTS

| | | |
|---|---|---|
| JP | 2012-80496 A | 4/2012 |
| JP | 2012-213143 A | 11/2012 |
| JP | 2013-544479 A | 12/2013 |
| JP | 5631743 B2 | 11/2014 |
| KR | 10-2003-0051600 A | 6/2003 |
| KR | 10-2006-0031853 A | 4/2006 |
| KR | 10-2009-0124679 A | 12/2009 |
| KR | 10-2014-0055146 A | 5/2014 |
| WO | 2009093036 A2 | 7/2009 |

OTHER PUBLICATIONS

Noh, T.G. et al, "Quantum Cryptography", ETRI (May 10, 205) pp. 70-83, English Abstract, 15 pages.

* cited by examiner

FIG. 1

| First Step:<br>Alice – selects a basis | ✥ | ✖ | ✖ | ✥ | ✖ | ✥ | ✖ | ✥ |
|---|---|---|---|---|---|---|---|---|
| Second Step:<br>Alice – selects a secret key value | 1 | 0 | 1 | 1 | 0 | 0 | 0 | 0 |
| Third Step:<br>Bob – selects a basis | ✥ | ✖ | ✥ | ✖ | ✖ | ✥ | ✥ | ✥ |
| Fourth Step:<br>measures the secret key value | 1 | 0 | 1 | 0 | 0 | 0 | 0 | 0 |
| Fifth Step:<br>compares bases – sifted key | O | O | – | – | O | O | – | O |

| quantum states corresponding to secret key values |
|---|
| 0: ↔ ↗ |
| 1: ↕ ↘ |

FIG. 2

MOBILE DEVICE HAVING QUANTUM CRYPTOGRAPHIC SECURITY FUNCTION FOR MOBILE COMMERCE, AND AUTHENTICATION METHOD

CROSS-REFERENCE TO RELATED APPLICATION

This application is a continuation of PCT/KR2016/000765 filed on Jan. 25, 2016, which claims priority to Korean Application No. 10-2015-0011344 filed on Jan. 23, 2015, which applications are incorporated herein by reference.

TECHNICAL FIELD

The present invention relates to technologies regarding a communication device and a server which are capable of cryptographic communication based on quantum cryptography, and more specifically to a quantum cryptography-based communication in a communication device and a server, which are intended to enhance the security of an alternative payment system based on mobile commerce.

BACKGROUND ART

With the rapid expansion of the use of wired/wireless communication including Internet communication, issues related to the security of communication networks have become increasingly important in terms of the protection of the important secrets of nations, corporations, and banks and the protection of personal privacy. The asymmetric public key cryptosystem which was developed in the 1970s and is currently being widely used in communication systems, such as the Internet, etc., is a method designed to encrypt information by using a mathematically complex problem as a public key and to decrypt the information by using the solution to the problem as a private key, and is based on a mathematical "computational complexity" in principle.

As a representative, the RSA public key cryptosystem developed by the three persons, i.e., Rivest, Shamir, and Adleman, uses the difficulty of factoring very large numbers into primes. In other words, from a mathematical aspect, the factoring problem is based on the fact that as the size of a problem increases, computational time increases exponentially, with the result that when a sender and a receiver use the problem of factoring a sufficiently large number as a public key, it is practically impossible for an eavesdropper to decrypt a cryptogram. However, the security of the cryptosystem based on computational complexity is being questioned due to the development of more elaborate algorithms. Furthermore, as Peter Shor at AT&T developed a factoring algorithm using a quantum computer in 1994, it was proven that the RSA cryptosystem could be fundamentally cracked if a quantum computer was developed.

Quantum cryptography technology proposed as an alternative intended to overcome the above security problem has security based on the principle of quantum mechanics, i.e., the fundamental law of nature, rather than mathematical computational complexity, and thus it makes eavesdropping and monitoring difficult, with the result that it has attracted great attention recently. In other words, quantum cryptography technology is a technology designed to absolutely securely distribute a secret key (a one-time pad) between a sender and a receiver in real time based on the law of quantum physics, such as "the nonclonability of quantum information," and is also known as "quantum key distribution (QKD) technology."

The first quantum cryptography protocol was presented by C. H. Bennett at IBM and G. Brassard at the University of Montreal in 1984. This protocol named after the creators as the BB84 protocol uses four quantum states (for example, the polarization states of a single photon) constituting two bases.

One example of quantum cryptography technology is disclosed in the article "Quantum Cryptography Technology," Electronics and Telecommunication Trend Analysis, Vol. 20, No. 15, October 2005.

The prior art relates to quantum cryptography technology using the quantum system of a two-dimensional Hilbert space, i.e., a qubit (a quantum bit).

However, according to the prior art, transmission and reception devices are required between a communication device and a server in order to transmit and receive a quantum cryptogram, and thus the prior art has its limitation in that the burden of a cost for the transmission and reception devices between the communication device and the server increases.

SUMMARY OF THE DISCLOSURE

Quantum cryptography technology has significantly high security because a signal is deconstructed when eavesdropping is performed and this technology has a nonclonable attribute. However, the high cost of devices required to transmit and receive a quantum cryptogram has been an obstacle to the popularization of quantum cryptography technology for general users.

In particular, when a quantum cryptogram is received, the quantum cryptogram can be interpreted only when a polarization- or phase-controlled optical signal is received in a specific pattern and attenuated and then a single photon is detected by a single photon detector. The cost of the single photon detector is considerably high, and is thus an obstacle to popularization. Furthermore, it is difficult to fabricate a quantum cryptography receiver in a small size due to its characteristics, and thus it is difficult to install the quantum cryptography receiver in a general user terminal.

Conventional research and development into quantum cryptography technology focus chiefly on the efforts to improve the sensitivity and reliability of the reception of a quantum cryptogram. In conclusion, according to the conventional technology, quantum cryptography technology has high barriers to the access of general users.

An object of the present invention is to propose an authentication protocol using quantum cryptography via a terminal which can be formed to be small and lightweight and implemented at low cost by improving part of an authentication process via quantum cryptography. An object of the present invention is to propose an authentication protocol using quantum cryptography between a mobile device and a server or relay and to propose an authentication method which can perform user authentication while maintaining high security in mobile commerce via the authentication protocol.

Furthermore, an object of the present invention is to propose a communication device capable of authentication using quantum cryptography, which can be formed to be small and lightweight and implemented at low cost. Another object of the present invention is to propose a user authentication technique for mobile commerce via the communication device.

An object of the present invention is to provide mobile commerce via user authentication by generating a secret key via quantum cryptography-based encryption communication via a communication device including an optical transmission unit and a server including an optical receiver unit and sharing the generated secret key between the communication device and the server.

Furthermore, an object of the present invention is to provide mobile commerce via quantum cryptography and user authentication, which is applicable to an environment in which a wired communication technique via an optical fiber or a free-space optical communication via a laser diode or photo diode can be used as a technique for sending a photon signal having a phase time difference and including a quantum cryptogram from a communication device to a server.

Furthermore, an object of the present invention is to increase the security of a mobile payment application between a communication device and a server via a quantum key distribution (QKD) method.

According to an aspect of the present invention, there is provided a communication device, including: a quantum signal generation unit configured to generate a series of first quantum signals by using a first quantum filter; an optical transmission unit configured to send the series of first quantum signals to a server; and a processor configured to select the first quantum filter based on a series of randomly generated first quantum states, and to control the quantum signal generation unit to generate the series of first quantum signals by using the first quantum filter; wherein the processor includes: a random number generation unit configured to randomly generate the series of first quantum states based on random numbers; an encryption unit configured to send information about the first quantum filter to the server, to receive information about the second quantum filter from the server, and to generate a secret key in conjunction with the server based on the information about the first quantum filter and the information about the second quantum filter; and a user authentication unit configured to perform user authentication in conjunction with the server by using the secret key. In this case, there may be implemented an embodiment in which a polarization property is imparted to a photon used as a quantum signal, the photon is sent, and then the photon is measured and received using a polarization basis, and an embodiment in which a phase time difference is imparted to a photon and then the photon is measured and received using an interferometer. In the embodiment using polarization properties, the quantum filter may be a polarization basis, and the quantum signals may be polarized signals. In contrast, in the embodiment using phase time differences, the quantum filter may be a phase generator (a phase basis), and the quantum signals may be signals to which a phase time difference has been imparted.

According to another aspect of the present invention, there is provided a quantum cryptography communication server, including: an optical receiver unit configured to receive a series of second quantum signals generated in such a manner that a series of first quantum signals generated by a first quantum filter and sent from a communication device pass through a second quantum filter; and a processor configured to select the second quantum filter based on a series of randomly generated first quantum states, and to control the optical receiver unit to receive the series of second quantum signals by passing the series of first quantum signals through the second quantum filter; wherein the processor includes: a random number generation unit configured to generate the series of first quantum states based on random numbers; an encryption unit configured to determine a series of second quantum states by using the series of received second quantum signals, to receive information about the first quantum filter from the communication device, to send information about the second quantum filter to the communication device, and to generate a secret key in conjunction with the communication device from the series of determined second quantum states based on the information about the first quantum filter and the information about the second quantum filter; and a user authentication unit configured to perform user authentication in conjunction with the communication device by using the secret key.

According to still another aspect of the present invention, there is provided a quantum cryptography authentication method for a communication device, the method including: generating, by a quantum signal generation unit, a series of first quantum signals by using a first quantum filter; sending the series of first quantum signals to a server; and selecting the first quantum filter based on a series of randomly generated first quantum states, and controlling the quantum signal generation unit to generate the series of first quantum signals by using the first quantum filter; wherein the controlling includes: randomly generating the series of first quantum states based on random numbers; sending information about the first quantum filter to the server, receiving information about the second quantum filter from the server, and generating a secret key in conjunction with the server based on the information about the first quantum filter and the information about the second quantum filter; and performing user authentication in conjunction with the server by using the secret key.

The generating a secret key may include: sending the information about the first quantum filter to the server by using a wired/wireless communication network; and receiving the information about the second quantum filter from the server. The sending the series of first quantum signals may include sending the series of first quantum signals to the server by using a free-space optical communication.

The generating a secret key may include generating a series of secret keys based on a series of second quantum states randomly generated based on the random numbers; and the controlling may include determining the quantum signal values of the series of first quantum signals based on the series of secret keys. The randomly generating may include randomly generating the quantum states by using a quantum random number generator (QRNG). In this case, the quantum signal values may be specific polarization directions in the embodiment using polarization properties, and the quantum signal values may be specific phase values in the embodiment using phase time differences.

According to still another aspect of the present invention, there is provided a communication method for a quantum cryptography communication server, the method including: receiving, by an optical receiver unit, a series of second quantum signals generated in such a manner that a series of first quantum signals generated by a first quantum filter and sent from a communication device pass through a second quantum filter; and selecting the second quantum filter based on a series of randomly generated first quantum states, and controlling the optical receiver unit to receive the series of second quantum signals by passing the series of first quantum signals through the second quantum filter; wherein the controlling includes: generating the series of first quantum states based on random numbers; measuring a series of second quantum states by using the series of received second quantum signals, receiving information about the first quantum filter from the communication device, sending information about the second quantum filter to the communication device, and generating a secret key in conjunction with the communication device from the series of determined second quantum states based on the information about the first quantum filter and the information about the second quantum filter; and performing user authentication in conjunction with the communication device by using the secret key.

The generating a secret key may include: sending the information about the second quantum filter to the communication device by using a wired/wireless communication network; and receiving the information about the first quantum filter from the communication device.

The receiving a series of second quantum signals may include receiving the series of second quantum signals, generated in such a manner that the series of first quantum signals sent from the communication device pass through the second quantum filter, from the communication device by using a free-space optical communication.

The communication method may further include transferring the series of second quantum signals to a second server through the second quantum filter; and the generating a secret key may include sharing at least one of the information about the second quantum filter and the secret key with the second server. The transferring may include: transferring the series of second quantum signals to the second server via an optical cable; or transferring the series of second quantum signals to the second server by using a free-space optical communication.

BRIEF DESCRIPTION OF THE DRAWINGS

The above and other objects, features and advantages of the present invention will be more clearly understood from the following detailed description taken in conjunction with the accompanying drawings, in which:

FIG. 1 is a view showing a conventional quantum cryptography method;

FIG. 2 is a view showing a method of identifying eavesdropping via conventional quantum cryptography;

DETAILED DESCRIPTION OF THE DISCLOSURE

Figure 3:
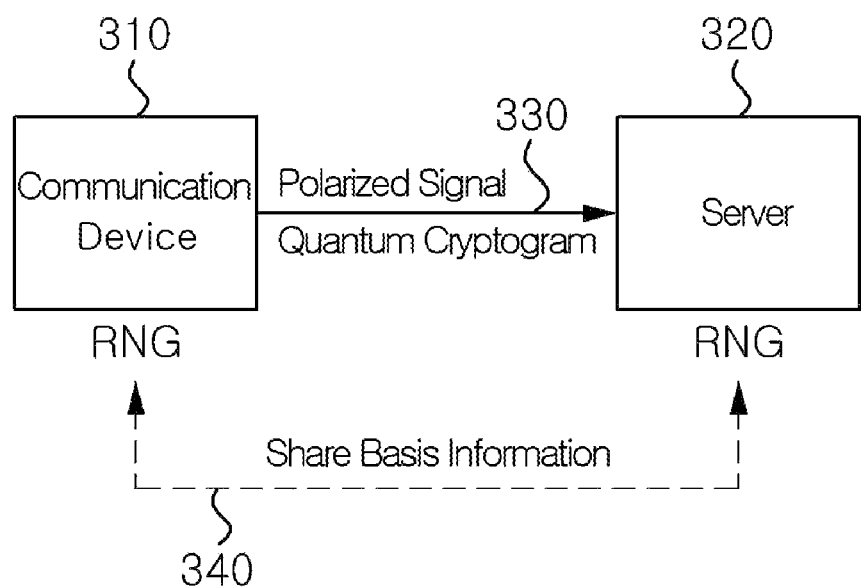
FIG. 3 is a diagram showing the communication relationship between a communication device and a server according to an embodiment of the present invention.

The above and other objects, features and advantages of the present invention will be more clearly understood from the following detailed description of embodiments taken in conjunction with the accompanying drawings.

The embodiments of the present invention will be described in detail with reference to the accompanying drawings. In the following description of the present invention, a detailed description of a related well-known component or function will be omitted when it is determined that the detailed description may make the gist of the present invention obscure.

The prevent invention is not limited to the embodiments. Throughout the accompanying drawings, the same reference symbols designate the same components.

FIG. 1 is a view showing a conventional quantum cryptography method. It will be apparent to those skilled in the art that the quantum cryptography technique shown in FIG. 1 can be used for the implementation of the present invention within the range in which the spirit of the present invention is not impaired and the range of the rights of the present invention is not reduced.

The first quantum cryptography protocol was presented by C. H. Bennett at IBM and G. Brassard at the University of Montreal in 1984. This protocol named after the creators as the BB84 protocol uses four quantum states (for example, the polarization states of a single photon) constituting two bases, as shown in FIG. 1.

In other words, a sender Alice randomly selects one of two bases, i.e., ✤ or ☒, at a first step, and randomly selects one of the two quantum states (secret key values), i.e., 0 and 1, of this selected basis and sends the selected quantum state to a receiver Bob at a second step. The receiver Bob who has received the quantum state also randomly selects one of the two bases at a third step, and determines the received quantum state by using this selected basis at a fourth step. After the receiver Bob has performed the measurement, the sender Alice and the receiver Bob reveal the bases, randomly selected by themselves, to each other. When the basis selected by the sender Alice and the basis selected by the receiver Bob are the same, the result measured by the receiver Bob is the same as the quantum state randomly selected by the sender Alice, and thus it is determined that the two users have the same secret keys (sifted keys) at a fifth step.

Figure 2:
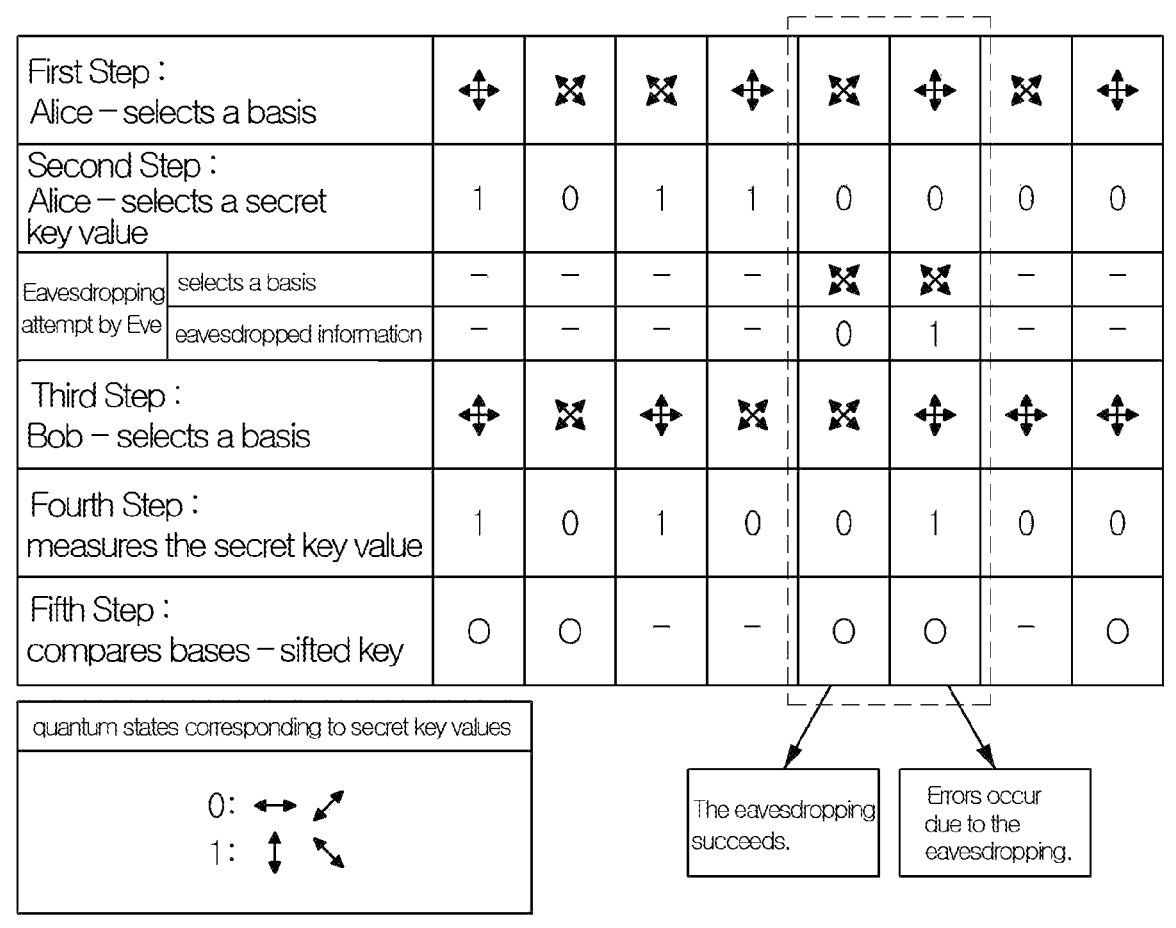

FIG. 2 is a view showing a method of identifying eavesdropping via conventional quantum cryptography. It will be apparent to those skilled in the art that the quantum cryptography technique shown in FIG. 2 can be used for the implementation of the present invention within the range in which the spirit of the present invention is not impaired and the range of the rights of the present invention is not reduced.

Referring to FIG. 2, during the quantum cryptography process from the first step to the fifth step described with reference to FIG. 1, if an eavesdropper Eve attempts eavesdropping, errors occur in secret key values obtained by the two users Alice and Bob according to the basic principle of quantum mechanics. The sender Alice and the receiver Bob reveal parts of generated keys to each other, and then the ratio of errors is calculated, thereby determining whether the eavesdropper Eve is present.

There may be implemented an embodiment in which a polarization property is imparted to a photon used as a quantum signal, the photon is sent, and then the photon is measured and received using a polarization basis, as shown in FIGS. 1 and 2. Furthermore, there may be implemented another embodiment in which a phase time difference is imparted to a photon and then the photon is measured and received using an interferometer. In the embodiment using polarization properties, a quantum filter may be a polarization basis, and a quantum signal may be a polarized signal. In contrast, in the embodiment using phase time differences, a quantum filter may be a phase generator, and a quantum signal is a signal to which a phase time difference has been imparted.

For example, a phase time difference-based phase filter may have a phase delay value of 90/270 degrees or 0/180 degrees according to a randomly generated quantum state. In other words, a phase generator (a phase filter) having a phase delay value of 90/270 degrees may correspond to the quantum state "0," and a phase generator having a phase delay value of 0/180 degrees may correspond to the quantum state "1."

According to a secret key value, a quantum signal having one of specific quantum signal values, i.e., 90 and 270 degrees, or 0 and 180 degrees, within a predetermined phase generator may be generated.

In the generation of a quantum signal, the method using polarization properties and the method using phase time differences are well known, and are equivalent to each other. In the implementation of the spirit of the present invention, there is no substantial difference between the method using polarization properties and the method using phase time differences. The spirit of the present invention is not limited by the selection of one of these methods.

For ease of description, the process of generating and measuring a quantum signal is described with a focus on the method using polarization properties below.

FIG. 3 is a diagram showing the communication relationship between a communication device and a server according to an embodiment of the present invention.

A communication device 310 according to the present invention may be a mobile device or a personal terminal, generates a quantum cryptogram, and shares basis information, used for the generation of the quantum cryptogram, with a server 320. The communication device 310 functions as Alice shown in FIGS. 1 and 2, and the server 320 functions as Bob shown in FIGS. 1 and 2.

Polarized signals including the quantum cryptogram generated by the communication device 310 are transferred to the communication server 320 via an optical communication channel 330, and the basis information used for the generation of the quantum cryptogram by the communication device 310 may be shared via a general communication network 340 between the communication device 310 and the communication server 320. The server 320 receives and interprets the polarized signals, in which case basis information used for the interpretation of the polarized signals may be shared with the communication device 310 via the communication network 340.

In this case, the communication device 310 may send the polarized signals including the quantum cryptogram to the server 330 via an optical fiber capable of optical communication. Meanwhile, when the communication device 310 is a mobile device, the polarized signals including the quantum cryptogram may be sent from the communication device 310 by using a free-space optical communication, and may be received by the communication server 320. In this case, the free-space optical communication technique refers to an optical communication technique that is used in an environment in which polarized signals sent by the communication device 310 can directly reach the server 320 without an obstacle in the path from the communication device 310 to the server 320. The free-space optical communication technique may be viewed as a direct face-to-face method. The communication device 310 may send the polarized signals by means of a laser diode (LD) or a photo diode (PD).

Furthermore, the communication device 310 and the server 320 may share the polarization basis information, used for the generation of the quantum cryptogram by the communication device 310, with each other via the general communication network 340 including a wired communication network and a wireless communication network. In contrast, the polarization basis information used for the reception and the interpretation by the server 320 may be shared with the communication device 310. In this case, each of the communication device 310 and the communication server 320 may generate the polarization basis information based on a series of quantum states randomly generated by the random number generation unit RNG of each of the communication device 310 and the communication server 320, and may share the polarization basis information with the other party. In this case, the generation of random numbers may be performed using a quantum random number generator (QRNG) in order to achieve more complete randomness.

Although FIG. 3 shows an embodiment in which a quantum cryptogram is sent directly from the communication device 310 to the server 320, the spirit of the present invention is not limited thereto, but there may be implemented an embodiment using a method in which a relay relays and transfers polarized signals. An embodiment of the relay method will be described using FIGS. 6 to 9 later.

Figure 4:
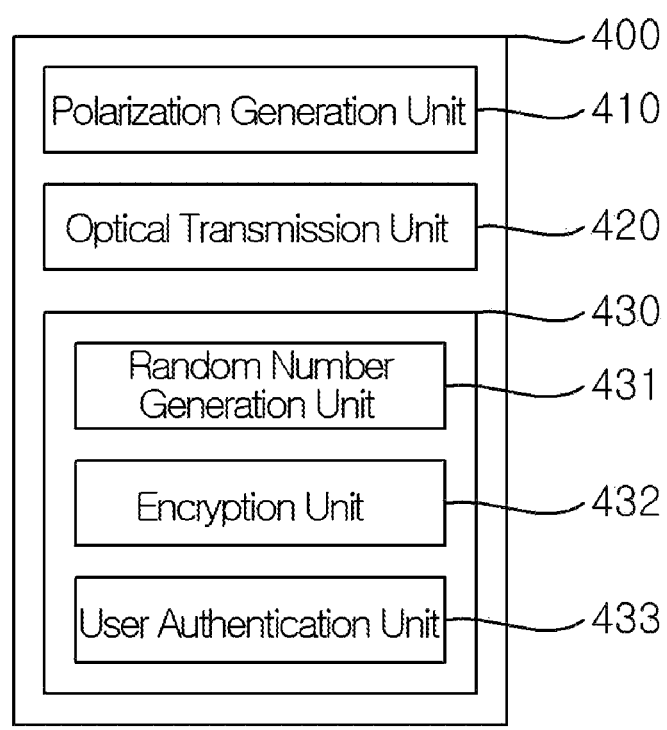
FIG. 4 is a diagram showing a communication device according to an embodiment of the present invention in detail.

FIG. 4 is a diagram showing a communication device 400 according to an embodiment of the present invention in detail.

The communication device 400 includes a polarization generation unit 410, an optical transmission unit 420, and a processor 430. In this case, the processor 430 includes a random number generation unit 431, an encryption unit 432, and a user authentication unit 433.

The polarization generation unit 410 refers to a polarization filter, and generates a series of first polarized signals by using a first polarization basis. In this case, the first polarization basis may be described based on the polarization bases shown in FIGS. 1 and 2. For ease of description, a 0 degree-based basis or a 45 degree-based basis shown in FIGS. 1 and 2 is possible. The first polarized signals refer to signals which are generated in such a manner that a series of bits (the secret key of FIGS. 1 and 2) generated to randomly have a value of 0 or 1 pass through a polarization filter.

The optical transmission unit 420 sends the series of first polarized signals, generated by the polarization generation unit 410, to a server. In this case, the first polarized signals may be transferred directly from the communication device 400 to the server without the intervention of a relay, or may be transferred to the server via a relay.

In this case, the optical transmission unit 420 may send the series of first polarized signals to the server by using a free-space optical communication. The free-space optical communication technique refers to an optical communication technique using a direct face-to-face method, as described above.

In this case, a laser diode or photo diode does not require high output. It is sufficient if the laser diode or photo diode has only enough output to send a quantum cryptogram via free-space optical communication or direct face-to-face optical communication between the communication device 400 and the server.

For example, when the distance between the communication device 400 and the server is within 10 cm, it will be sufficient if a laser diode or photo diode having enough output to send and receive a quantum cryptogram without loss is installed in the communication device 400.

The processor 430 may include the random number generation unit 431, the encryption unit 432 and the user authentication unit 433 as sub-modules. These sub-modules may be implemented and distinguished using hardware, or may be implemented and distinguished using programs, a set of commands, or a set of instructions loaded onto memory.

The processor 430 selects the first polarization basis based on a series of randomly generated first quantum states, and controls the polarization generation unit 410 to generate the series of first polarized signals by using the first polarization basis.

The random number generation unit 431 included in the processor 430 randomly generates the series of first quantum states based on random numbers. The encryption unit 432 controls the communication module of the communication device 400 to send information about the first polarization basis to the server, in which case the communication module may use general wired/wireless communication. The encryption unit 432 controls the communication module of the communication device to receive information about a second polarization basis from the server.

Furthermore, the processor 430 may further include a polarization control unit (not shown) configured to determine the polarization directions of the series of first polarized signals based on a series of secret keys generated by the encryption unit 432 based on the series of second quantum states randomly generated by the random number generation unit 431.

Furthermore, the random number generation unit 431 may further increase the randomness of the quantum states by using a QRNG.

Thereafter, the encryption unit 432 generates a secret key in conjunction with the server based on the information about the first polarization basis and the information about the second polarization basis. The secret key may be used for user authentication between the terminal 400 and the server via the user authentication unit 432. As described above, the secret key includes quantum cryptograms which have been sent by the terminal 400 and whose stable reception has been confirmed by the server. The secret key is known only to the terminal 400 and the server, and thus a third party cannot perform eavesdropping/monitoring.

Meanwhile, the encryption unit 432 may generate the secret key (see FIGS. 1 and 2) and the first polarization basis constituting quantum cryptograms by using the random number-based random quantum states generated by the random number generation unit 431. In this case, for ease of description, a series of quantum states each having a value of 0 or 1 adapted to determine a polarization basis is referred to as a "first quantum state," and a series of quantum states adapted to determine the secret key shown in FIGS. 1 and 2 is referred to as a "second quantum state."

The user authentication unit 433 performs user authentication between the communication device 400 and the server by using the secret key generated by the encryption unit 432. Accordingly, a user may apply the quantum cryptography-based user authentication technique to a mobile commerce payment system that performs transactions, such as remittance, payment, etc., requiring the authentication of the user.

Figure 5:
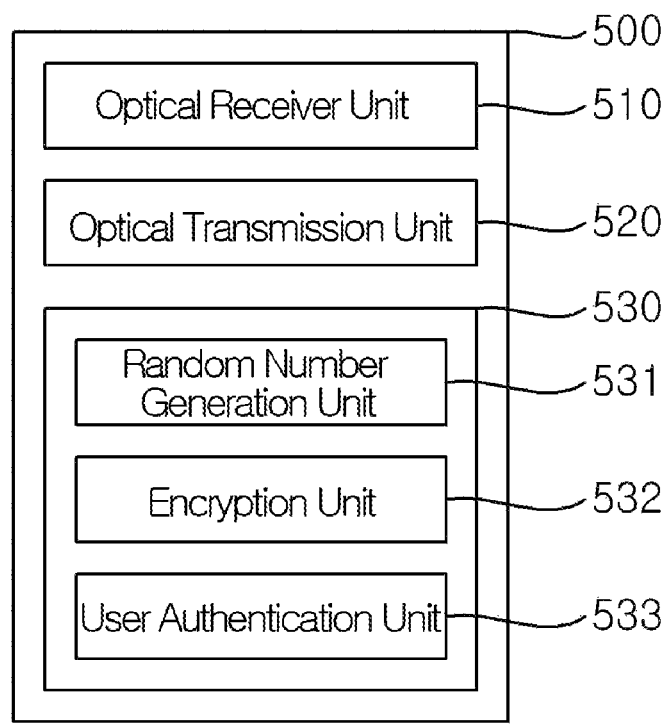
FIG. 5 is a diagram showing a communication server according to an embodiment of the present invention in detail.

FIG. 5 is a diagram showing a communication server 500 according to an embodiment of the present invention in detail.

The quantum cryptography communication server 500 includes an optical receiver unit 510, an optical transmission unit 520, and a processor 530.

In this case, the communication server 500 may include a fixed terminal configured to enable banking, finance or card payment and equipped with a security function, such as a POS terminal, or a bank ATM terminal, without limitation. The server 500 shares information, obtained through communication and authentication in conjunction with the communication device 400, with a service provider (SP) who provides card, finance or banking service, or the like, thereby performing a payment, banking, or finance transaction.

The optical receiver unit 510 includes a polarization filter, and receives a series of second polarized signals generated in such a manner that the series of first polarized signals generated based on the first polarization basis and sent by the communication device 400 pass through (are polarization-filtered based on) the second polarization basis (selected by the server 500).

In this case, the optical receiver unit 510 may receive the series of second polarized signals, generated in such a manner that the series of first polarized signals sent by the communication device 400 pass through the second basis, from the communication device 400 by using any one of an optical communication technique using an optical cable and a free-space optical communication. However, in an environment in which the communication device 400 is a mobile device, it is advantageous to use the free-space optical communication.

The processor 530 selects the second polarization basis based on a series of randomly generated third quantum states, i.e., random information adapted to determine a polarization basis on a reception side, and controls the optical receiver unit (polarization filter) 510 to receive the series of second polarized signals by passing the series of first polarized signals through the second polarization basis.

In this case, the processor 530 may include a random number generation unit 531, an encryption unit 532, and a user authentication unit 533.

The random number generation unit 531 generates the series of third quantum states based on random numbers, and the encryption unit 532 determines a series of fourth quantum states, i.e., the quantum states of received signals, by using a series of second polarized signals received from the communication device 400, and receives the information about the first polarization basis from the communication device 400. Thereafter, the encryption unit 532 sends the information about the second polarization basis to the communication device 400, and generates a secret key in conjunction with the communication device 400 from the series of fourth quantum states determined based on the information about the first polarization basis and the information about the second polarization basis.

In this case, the encryption unit 532 may send the information about the second polarization basis to the communication device 400 over a wired communication network or a wireless communication network, and may receive the information about the first polarization basis from the communication device 400.

In the case of being related to the embodiment of any one of FIGS. 6 to 9 to be described later, the optical transmission unit 520 may transfer the series of second polarized signals to a second server through the second basis. In this case, only the information about the second basis may be shared with the second server, or only the secret key generated by the encryption unit 532 may be transferred to and shared with the second server by using a separate dedicated channel having enhanced security. Alternatively, both the information about the second basis and information about the secret key may be shared with the second server by using the dedicated channel.

Furthermore, the optical transmission unit 520 may transfer the series of second polarized signals to the second server via an optical cable, may transfer the series of second polarized signals to the second server by using a free-space optical communication technique, or may transfer the series of second polarized signals to the second server through a satellite relay station.

The user authentication unit 533 performs user authentication between the communication device 400 and the communication server 500 by using the secret key generated by the encryption unit 532. Accordingly, a user may apply the quantum cryptography-based user authentication technique to a mobile commerce payment system that performs transactions, such as remittance, payment, etc., requiring the authentication of the user.

Figure 6:
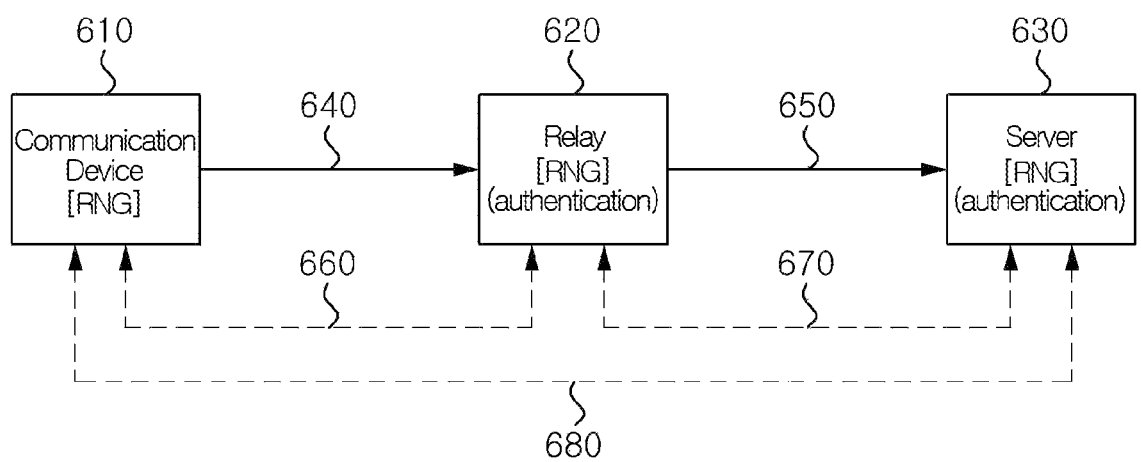
FIG. 6 is a diagram showing a quantum cryptography-based communication and user authentication network system including a relay according to an embodiment of the present invention.

FIG. 6 is a diagram showing a quantum cryptography-based communication and user authentication network system including a relay according to an embodiment of the present invention. Referring to FIG. 6, there is shown the communication and user authentication network system in which each of the relay 620 and the communication server 630 performs independent user authentication.

The communication and user authentication network system of FIG. 6 includes a communication device 610, a relay 620, and a server 630. In this case, each of the communication device 610, the relay 620, and the server 630 may include an RNG.

The communication device 610 selects a first polarization basis based on a series of randomly generated first quantum states, and sends a series of first polarized signals, generated based on the first polarization basis, to the relay 620 by using a free-space optical communication channel 640.

The relay 620 may include modules, such as the optical receiver unit 510 and optical transmission unit 520 shown in conjunction with the server 500 of FIG. 5. The relay 620 may determine a second polarization basis based on a series of third quantum states generated by the RNG. The relay 620 obtains second polarized signals by passing the first polarized signals, received via the optical communication channel 640, through the second polarization basis.

Thereafter, the communication device 610 and the relay 620 share information about the first polarization basis generated by the communication device 610 and information about the second polarization basis generated by the relay 620 via a wired/wireless communication network 660.

Each of the communication device 610 and the relay 620 may generate a first secret key between the communication device 610 and the relay 620 by using quantum cryptograms, whose measurement has been succeeded by a reception side, based on the information about the first polarization basis and the information about the second polarization basis, and may share the first secret key with the other party. The relay 620 may process first user authentication with the communication device 610.

Since the server 630 includes its own separate RNG, the server 630 may determine a third polarization basis through the separate generation of random numbers. In this case, the relay 620 may transfer the second polarized signals to the server 630 by using the optical communication channel 650, and the server 630 may obtain third polarized signals by passing the second polarized signals through the third polarization basis. In this case, the optical communication channel 650 may be an optical cable, a free-space optical communication channel, or an optical communication channel passing through a satellite.

In this case, the relay 620 may transfer information about the result of the first user authentication to the server 630 via a wired/wireless communication network 670. The server 630 may complete the authentication of the user by integrating the result of second user authentication to be described later with the result of the first user authentication, and may request a transaction from an SP who provides payment, banking or finance service, or the like.

In this case, the communication device 610 and the server 630 may share the first polarization basis information generated by the communication device 610 and the third polarization basis information generated by the server 630 with each other via a wired/wireless communication network 680.

Accordingly, the server 630 may generate a second secret key between the communication device 610 and the server 630 based on the information about the first polarization basis and the information about the third polarization basis, and may share the second secret key with the communication device 610. The server 630 may process second user authentication based on the second secret key.

In this case, the server 630 may transfer information about the result of the second user authentication to the relay 620 via the wired/wireless communication network 670.

Alternatively, according to another embodiment of the present invention, the relay 620 may transfer the second polarized signals, generated in such a manner that the series of first polarized signals generated based on the first polarization basis and sent by the communication device 610 pass through the second polarization basis at the relay 620, to the server 630 via the optical communication channel 650, in which case information about the first polarization basis and information about the second polarization basis may be simultaneously transferred to the server 630 via the wired/wireless communication network 670.

Accordingly, the server 630 may generate a third secret key between the communication device 610 and the server 630 based on the information about the first polarization basis, the information about the second polarization basis, and the information about the third polarization basis, and may share the third secret key with the communication device 610. The server 630 may process second user authentication.

In this case, the server 630 may transfer information about the result of the second user authentication to the relay 620 via the wired/wireless communication network 670.

In this case, the information about the first polarization basis at the communication device 610 may be transferred from the communication device 610 via the wired/wireless communication network 680 to the server 630.

Figure 7:
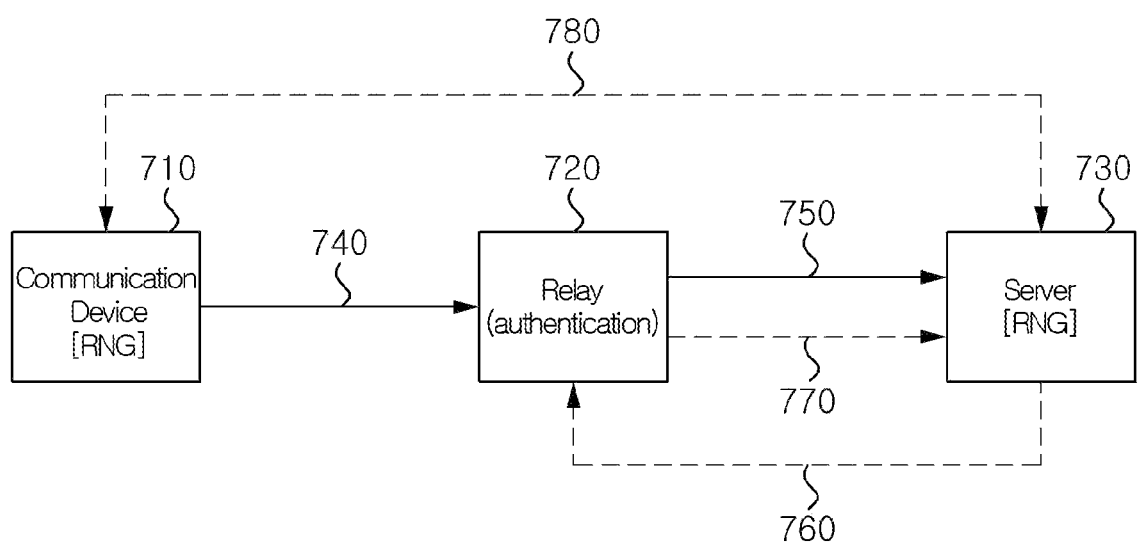
FIG. 7 is a diagram showing a quantum cryptography-based communication and user authentication network system including a relay according to another embodiment of the present invention.

FIG. 7 is a diagram showing a quantum cryptography-based communication and user authentication network system including a relay according to another embodiment of the present invention. Referring to FIG. 7, there is shown the communication and user authentication network system in which a relay 720 performs a quantum cryptography-based user authentication.

The communication and user authentication network system of FIG. 7 includes a communication device 710, a relay 720, and a server 730.

Since the communication device 710 of FIG. 7 performs the same function as the communication devices 310, 400 and 610 of FIGS. 3, 4 and 6, a redundant description thereof is omitted below. The relay 720 and server 730 of FIG. 7 are described with a focus on functions unique to the embodiment of FIG. 7, and redundant descriptions thereof are omitted below. The optical communication channel 740 may be viewed as having the same configuration as the optical communication channel 640 of FIG. 6.

In FIG. 7, there is shown an embodiment in which an RNG is included in the server 730 but an authentication process using quantum cryptography is performed by the relay 720. In other words, the relay 720 includes an optical reception module configured to receive first polarized signals, but does not include an RNG. Accordingly, the relay 720 receives third quantum state-based second polarization basis information, generated by the RNG of the server 730, from the server 730.

The second polarization basis information is transferred from the server 730 via a wired/wireless communication network 760 to the relay 720, and is shared with the communication device 710 via a wired/wireless communication network 780.

For the relay 720 to perform user authentication, first polarization basis information needs to be shared with the relay 720. The first polarization basis information may be transferred from the communication device 710 via a wired/wireless communication network (not shown) to the relay 720, or may be transferred from the communication device 710 via the wired/wireless communication network 780 to the server 730 and then transferred from the server 730 via the wired/wireless communication network 760 to the relay 720.

The result of user authentication performed by the relay 720 or a secret key may be transferred to the server 730 via a separate communication channel 770 maintaining security. Meanwhile, according to an embodiment of the present invention, the relay 720 may re-transfer second polarized signals to the server 730 via an optical communication channel 750. The server 730 may directly receive the second polarized signals, thereby re-checking the result of the user authentication performed by the relay 720. However, the possibility that an authentication process performed by the relay 720 might influence the quantum cryptogram needs to be taken into consideration.

Since the secret key may be obtained based on quantum cryptograms, the first polarization basis information and the second polarization basis information, the relay 720 having directly received the quantum cryptograms and the communication device 710 having generated the quantum cryptograms may share the secret key with each other in principle. To share the secret key with the server 730, the secret key may be transferred to the server 730 under a special condition, such as the condition of the separate communication channel 770 maintaining security, as described above.

Figure 8:
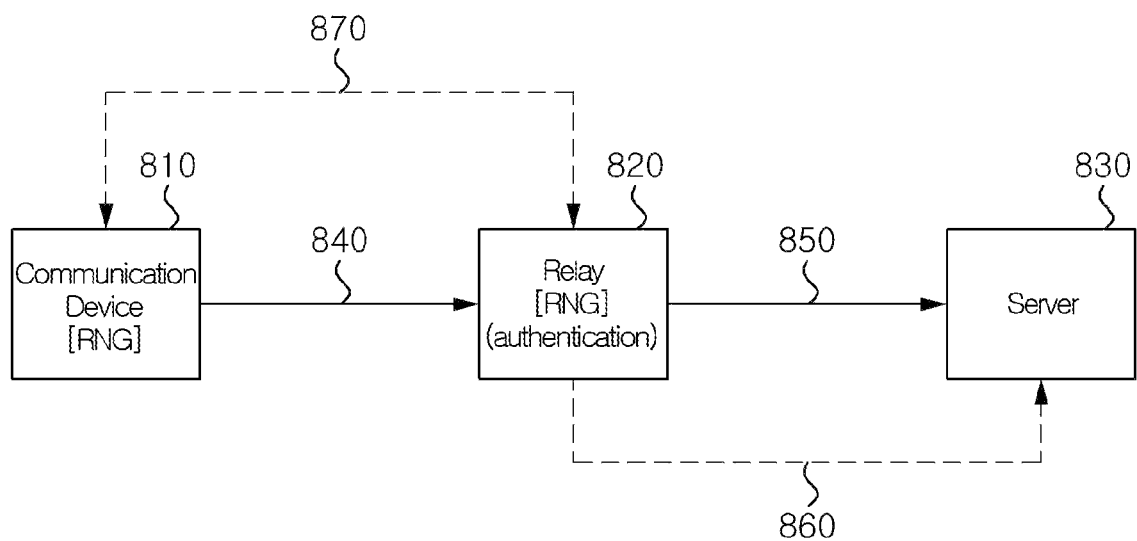
FIG. 8 is a diagram showing a quantum cryptography-based communication and user authentication network system including a relay according to still another embodiment of the present invention.

FIG. 8 is a diagram showing a quantum cryptography-based communication and user authentication network system including a relay according to still another embodiment of the present invention. The communication and user authentication network system of FIG. 8 corresponds to an embodiment in which random number generation and authentication processes are performed by a relay 820.

Referring to FIG. 8, an optical communication channel 840 transfers first polarized signals including a quantum cryptogram, generated by a communication device 810, to the relay 820. Since the relay 820 may generate quantum states by itself, it may generate second polarization basis information by itself.

The communication device 810 and the relay 820 may share first polarization basis information and the second polarization basis information via a wired/wireless communication network 870, may generate a secret key, and may perform quantum cryptography-based user authentication.

The relay 820 may transfer the result of the quantum cryptography-based user authentication to a server 830 via a wired/wireless communication network 860. The server 830 may generates a substantial transaction in conjunction with a service provider who provides banking, finance, or payment service, or the like, as described above.

In an embodiment, an optical communication channel 850 may deliver second polarized signals, received by the relay 820, to the server 830, or may deliver polarized signals, generated based on a new quantum cryptogram, to the server 830. Not only the result of the user authentication but also a secret key may be transferred to the server 830 via the wired/wireless communication network 860, in which case the communication network 860 needs to be a special communication network maintaining security.

Figure 9:
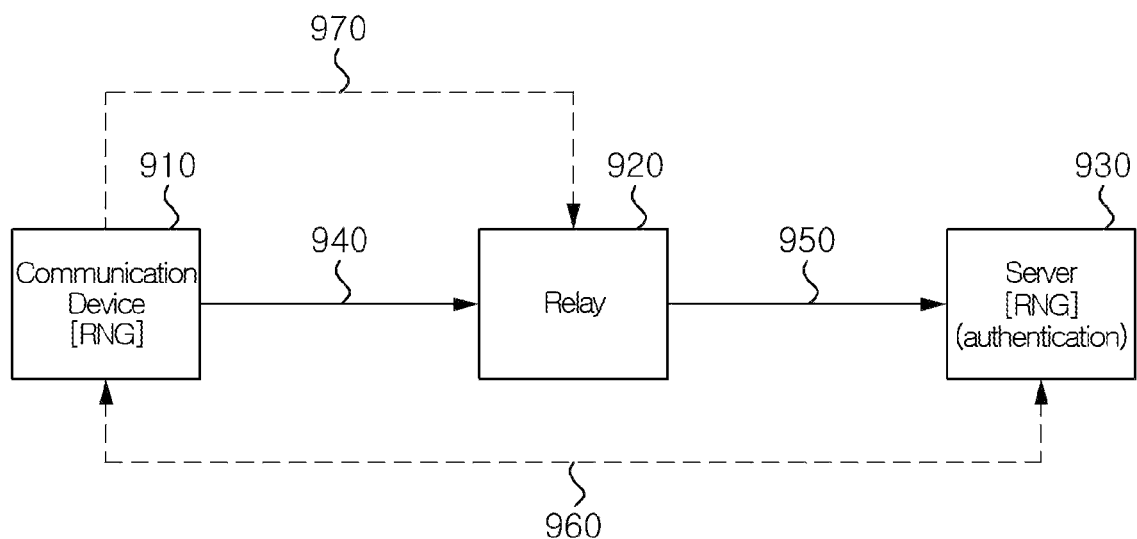
FIG. 9 is a diagram showing a quantum cryptography-based communication and user authentication network system including a relay according to still another embodiment of the present invention.

FIG. 9 is a diagram showing a quantum cryptography-based communication and user authentication network system including a relay according to still another embodiment of the present invention. The communication and user authentication network system of FIG. 9 corresponds to an embodiment in which a server 930 performs random number generation and user authentication.

The communication and user authentication network system of FIG. 9 includes a communication device 910, a relay 920, and the server 930.

Referring to FIG. 9, an optical communication channel 940 transfers first polarized signals including a quantum cryptogram, generated by the communication device 910, to the relay 920.

In this case, the relay 920 transfers the received first polarized signals to the server 930 via an optical communication channel 950 without change. The relay 920 receives first polarization basis information from the communication device 910 via a wired/wireless communication network 970. The relay 920 receives the first polarized signals by using the first polarization basis information, maintains the quantum cryptogram information of the first polarized signals, sends the quantum cryptogram information of the first polarized signals by using the first polarization basis information, and transfers the quantum cryptogram information of the first polarized signals to the server 930 via the optical communication channel 950.

Thereafter, the first polarization basis information generated by the communication device 910 and the second polarization basis information generated by the server 930 are shared via a wired/wireless communication network 960.

Accordingly, the server 930 may generate a secret key between the communication device 910 and the server 930 based on the first polarization basis information and the second polarization basis information, may share the secret key with the communication device 910, and may process user authentication.

Although the respective separate embodiments have been shown in FIGS. 6 to 9 for ease of description, the spirit of the present invention is not limited thereto. For example, in order to increase security, there may be implemented a modified embodiment in which the embodiment of FIG. 6 is applied to the first part of all the quantum cryptograms generated by the communication devices 310, 400, 610, 710, 810, and 910 and the embodiment of FIG. 8 is applied to the second part thereof, or there may be implemented a modified embodiment in which the embodiment of FIG. 7 is applied to the first part and the embodiment of FIG. 9 is applied to the second part.

Figure 10:
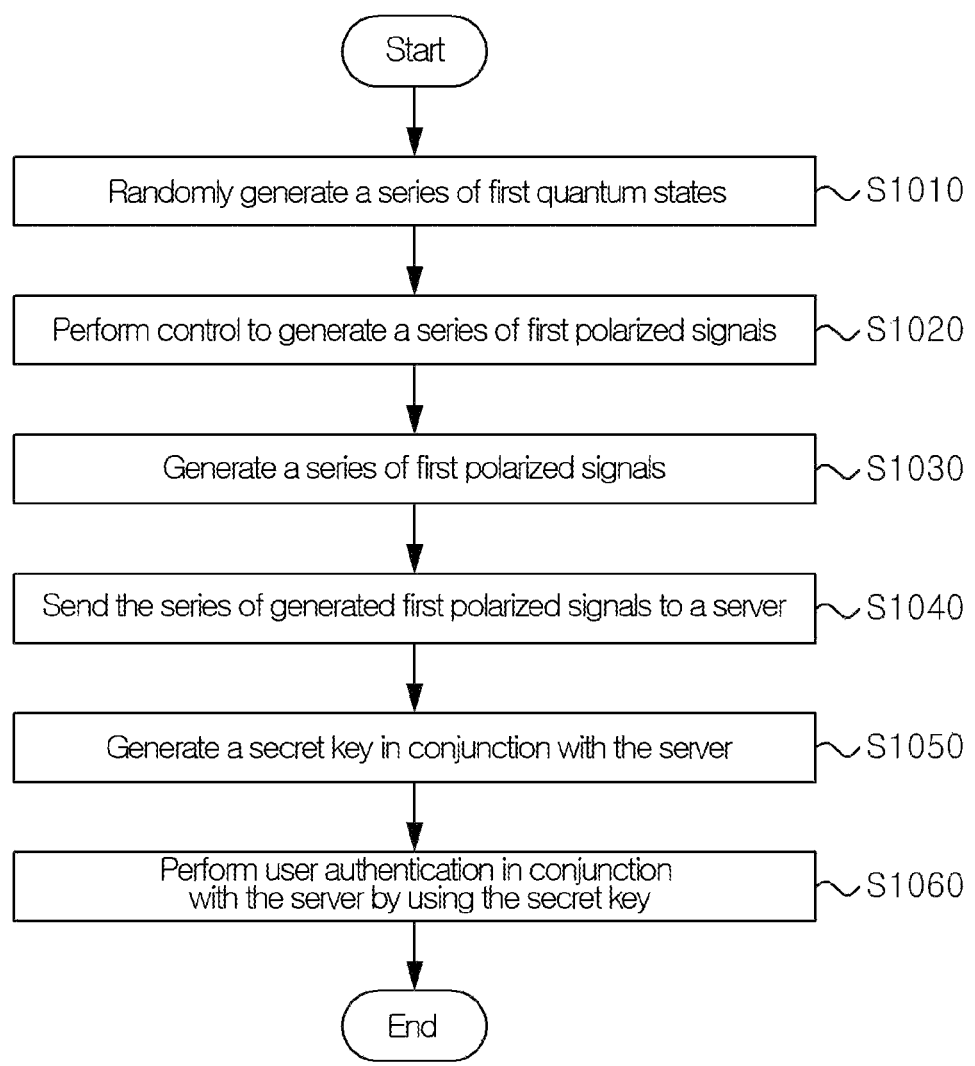
FIG. 10 is a flowchart showing a quantum cryptography authentication method for a communication device according to an embodiment of the present invention.

FIG. 10 is a flowchart showing a quantum cryptography authentication method for a communication device according to an embodiment of the present invention.

The quantum cryptography authentication method for a communication device includes step S1010 of randomly generating, by the random number generation unit 431, a series of first quantum states based on random numbers, and step S1020 of selecting, by the processor 430, a first polarization basis based on the series of randomly generated first quantum states and controlling, by the processor 430, the polarization generation unit 410 to generate a series of first polarized signals by using the first polarization basis.

Thereafter, the polarization generation unit 410 generates a series of first polarized signals by using the first polarization basis at step S1030, and the optical transmission unit 420 sends the series of first polarized signals to the server at step S1040. In this case, the processor 430 may send information about the first polarization basis to the server by using a separate communication module.

Thereafter, the processor 430 receives information about a second polarization basis from the server, the encryption unit 432 generates a secret key in conjunction with the server based on the information about the first polarization basis and the information about the second polarization basis at step S1050, and the user authentication unit 433 performs user authentication in conjunction with the server by using the secret key at step S1060.

In this case, the processor 430 may send the information about the first polarization basis to the server by using a wired communication network or a wireless communication network, and may receive the information about the second polarization basis from the server. The optical transmission unit 420 may send the series of first polarized signals to the server by using a free-space optical communication technique.

Furthermore, the encryption unit 432 may generate a series of secret keys based on a series of second quantum states randomly generated based on random numbers, and the polarization generation unit 410 may determine the polarization direction (an x-axis direction, a y-axis direction, or the like) of the series of first polarized signals based on the series of secret keys.

Furthermore, the random number generation unit 431 may further increase the randomness of the quantum states by using a QRNG.

Figure 11:
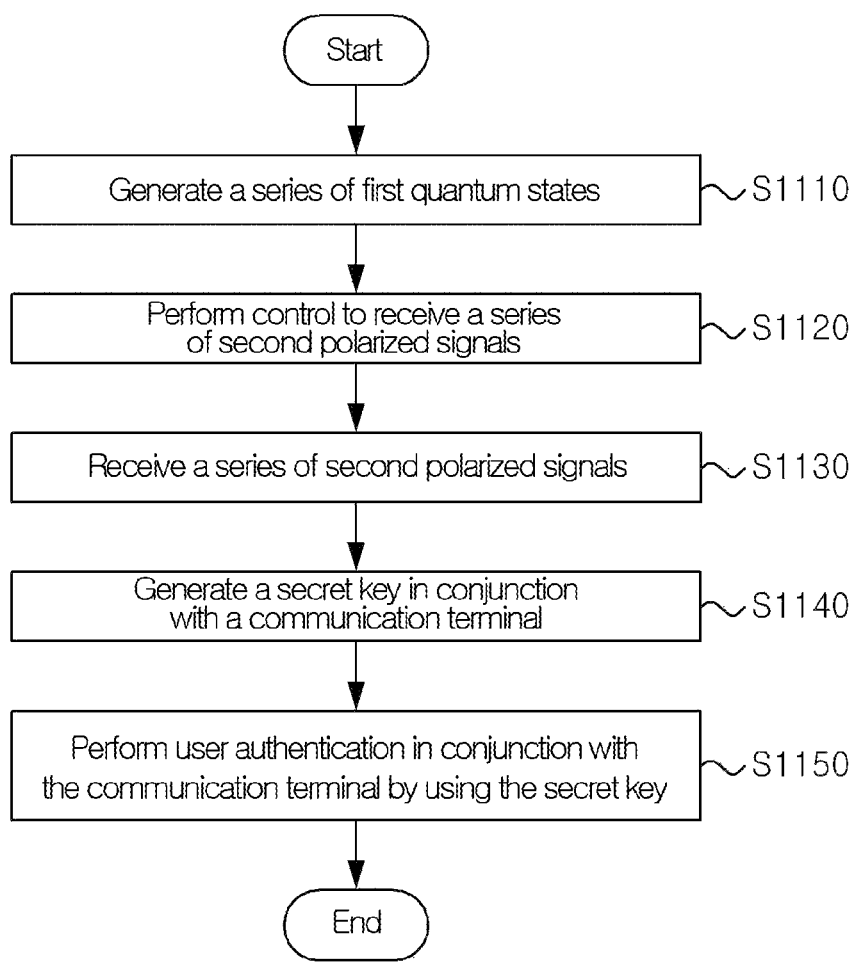
FIG. 11 is a flowchart showing a communication method for a quantum cryptography communication server according to an embodiment of the present invention.

FIG. 11 is a flowchart showing a communication method for a quantum cryptography communication server according to an embodiment of the present invention.

The communication method for a quantum cryptography communication server includes step S1110 of generating, by the random number generation unit 531, a series of first quantum states based on random numbers, and step S1120 of selecting, by the processor 530, a second polarization basis based on the series of randomly generated first quantum states and controlling, by the processor 530, the optical receiver unit to receive a series of second polarized signals by passing the series of first polarized signals through the second polarization basis.

In this case, the random number generation unit 531 may further increase the randomness of the quantum states by using a QRNG.

Thereafter, the optical receiver unit 510 receives a series of second polarized signals generated in such a manner that the series of first polarized signals generated based on the first polarization basis and sent by the communication device pass through the second polarization basis at step S1130. The optical receiver unit 510 or processor 530 determines a series of second quantum states by using the series of received second polarized signals, receives information about the first polarization basis from the communication device, and sends information about the second polarization basis to the communication device, and the encryption unit 532 generates a secret key in conjunction with the communication device from the series of second quantum states determined based on the information about the first polarization basis and the information about the second polarization basis at step S1140.

In this case, by using a wired communication network or a wireless communication network, the information about the second polarization basis may be sent to the communication device, and the information about the first polarization basis may be received from the communication device.

Furthermore, the reception of the first polarized signals or second polarized signals may be performed via a free-space optical communication channel established in conjunction with the communication device.

Furthermore, in an embodiment, the series of second polarized signals may be transferred to a second server via the second polarization basis, and the information about the second polarization basis may be shared with the second server. Furthermore, the secret key may be shared with the second server via a separate secure channel maintaining security.

Thereafter, the user authentication unit 533 may perform user authentication in conjunction with the communication device by using the generated secret key at step S1150.

Figure 12:
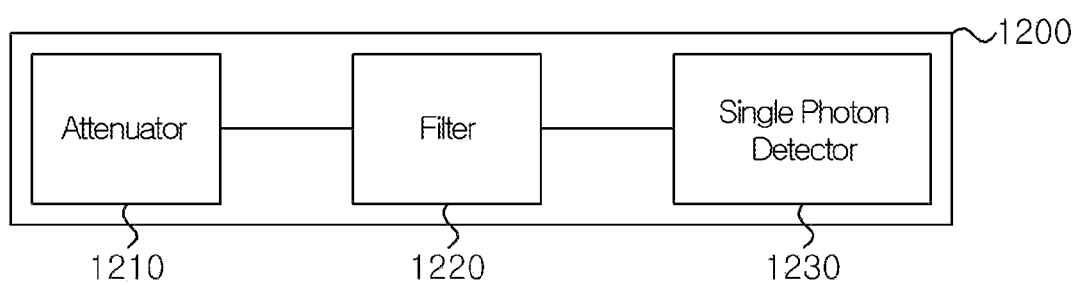
FIG. 12 is a diagram showing the optical receiver unit of a quantum cryptography communication server according to an embodiment of the present invention.

FIG. 12 is a diagram showing the optical receiver unit 1200 of a quantum cryptography communication server according to an embodiment of the present invention.

The optical receiver unit 1200 includes an attenuator 1210, a filter 1220, and a detector 1230.

The attenuator 1210 is a device configured to attenuate light (the amount or amplitude of light) propagating across an optical fiber or space by a predetermined level. The attenuator 1210 is required to provide appropriate input to a light reception device or an optical device, and is also used to evaluate the loss of an optical device.

Generally, methods of attenuating light include a method of attenuating light by absorbing part of the light, a method of attenuating light by reflecting part of the light, and a method of attenuating light by spatially blocking part of the light. Currently, the method of attenuating light by reflecting part of the light is chiefly being used. Accordingly, the attenuator 1210 functions to adjust first polarized signals, received via a free-space optical communication channel, to a set predetermined level.

The filter 1220 functions to filter the first polarized signals, adjusted to the predetermined level by the attenuator 1210, in a single photon form, and the detector 1230 determines the first quantum states of the filtered first polarized signals.

By using the optical receiver unit, the first polarized signals sent from the communication devices 310, 400, 610, 710, 810 and 910 may be controlled and received via a single photon by using a laser diode (LD) or a photo diode (PD).

The cost of the hardware required to receive polarized signals by controlling the polarized signals via a single photon, as shown in FIG. 12, is high, and thus it is difficult to install the hardware in a mobile device or a personal terminal. Accordingly, the present invention proposes the authentication protocol using quantum cryptography via the terminal which can be formed to be small and lightweight and implemented at low cost by improving part of an authentication process via quantum cryptography. According to the present invention, the authentication protocol using quantum cryptography between the mobile device and the server or relay can be implemented, through which in mobile commerce, user authentication can be performed while high security is being maintained.

Furthermore, the communication device according to the present invention only sends polarized signals to the server and does not need to be equipped with an optical reception function module, and thus the quantum cryptography protocol practically applicable to the communication device is proposed. The present invention provides a significant cost reduction effect compared to the conventional quantum cryptography technique.

In the present invention, an optical receiver unit is not included in the communication device, and the optical receiver unit for quantum cryptography is included in each of the server and the relay and thus can receive polarized signals sent by the communication device.

The communication device described herein may be a mobile communication device including a smartphone, a PDA, and a portable phone. The communication device may generate and send a quantum cryptogram by using a polarized signal generation device formed by combining an RNG and a laser diode.

Meanwhile, when the mobile device according to the present invention is disposed within a considerably short distance from the optical reception device of the server or relay, the mobile device can send a quantum cryptogram in a direct face-to-face manner. In this case, the mobile device and the server/relay are disposed within up to a short distance (for example, 1 cm) which can prevent a third party from practically performing eavesdropping. Since it is sufficient that the mobile device generates polarized signals at a strength at which the server/relay can receive the polarized signal, quantum cryptography-based mobile commerce can be implemented at low cost.

The quantum cryptography authentication method or quantum cryptography communication method according to an embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

According to the present invention, the authentication protocol using quantum cryptography via the terminal which can be formed to be small and lightweight and implemented at low cost can be implemented by improving part of an authentication process via quantum cryptography. According to the present invention, the authentication protocol using quantum cryptography between the mobile device and the server or relay can be implemented, through which in mobile commerce, user authentication can be performed while high security is being maintained.

The present invention has the advantage of implementing the communication device capable of authentication using quantum cryptography, which can be formed to be small and lightweight and implemented at low cost, and also has the advantage of performing user authentication for mobile commerce via the communication device.

According to the present invention, the advantage of improving the security of a mobile payment application can be achieved by using user authentication via the quantum cryptography authentication method between the communication device and the server.

Furthermore, the communication device according to the present invention only sends polarized signals to the server and does not need to be equipped with an optical reception function module, and thus the quantum cryptography protocol practically applicable to the communication device is proposed. The present invention provides a significant cost reduction effect compared to the conventional quantum cryptography technique. The present invention can achieve the above cost reduction effect in such a manner that the server receives a polarized signal, interprets the polarized signal, and shares basis information with the communication device via a general communication network. In other words, the communication device generates a secret key, and the basis information used for the interpretation of the generated secret key between a sending side (the communication device) and a reception side (the server) is shared via a separate network, and thus it is considered that information about a quantum cryptogram whose identification has been succeeded by both the sending side and the reception side is shared between them. In this case, a user authentication process can be performed between the sending side and the reception side by using the quantum cryptogram, whose identification has been succeeded by both the sending side and the reception side, as a secret key.

Furthermore, according to the present invention, mobile commerce via quantum cryptography and user authentication can be implemented regardless of an environment in which a wired communication technique via a optical fiber or a free-space optical communication via a laser diode or photo diode can be used as a technique for sending polarized signals including a quantum cryptogram from the communication device to the server.

While the present invention has been described in conjunction with specific details, such as specific components, and limited embodiments and diagrams above, these are provided merely to help an overall understanding of the present invention. The present invention is not limited to these embodiments, and various modifications and alterations can be made based on the foregoing description by those having ordinary knowledge in the art to which the present invention pertains.

Therefore, the technical spirit of the present invention should not be determined based only on the described embodiments, and the following claims, all equivalents to the claims and equivalent modifications should be construed as falling within the scope of the spirit of the present invention.

What is claimed is:

1. A mobile communication device, comprising:
    a quantum signal generator configured to generate a series of first quantum signals by using a first quantum filter;
    an optical transmitter configured to send the series of first quantum signals to a relay, the series of first quantum signals passing through a first quantum channel between the mobile device and the relay, and at least a part of the series of first quantum signals passing through a second quantum channel between the relay and a server and reaching the server,
        wherein a series of second quantum signals is generated such that the at least the part of the series of first quantum signals pass through a second quantum filter at the relay and transferred to the server via the second quantum channel,
        wherein information of the first quantum filter and the second quantum filter are transferred together to the server via a non-quantum channel, and
        wherein a series of third quantum signals is generated such that at least a part of the series of second quantum signals pass through a third quantum filter at the server; and
    a processor configured to:
        select the first quantum filter based on a series of randomly generated first quantum states;
        control the quantum signal generator to generate the series of first quantum signals by using the first quantum filter;
        randomly generate the series of first quantum states based on random numbers;
        receive information of the second quantum filter from the relay and receive information of the third quantum filter from the server;
        generate a first secret key in conjunction with the relay and the server by applying the information of the first quantum filter, the information of the second quantum filter, and the information of the third quantum filter to the series of first quantum signals; and
        perform user authentication in conjunction with the relay and the server by using the first secret key, wherein the first secret key is the same as a second secret key generated by the relay applying the information of the first quantum filter, the second quantum filter, and the third quantum filter to the series of second quantum signals, and wherein the first secret key is the same as a third secret key generated by the server applying the information of the first quantum filter, the second quantum filter, and the third quantum filter to the series of third quantum signals.

2. The mobile communication device of claim 1, wherein the mobile communication device is at least one of a mobile phone or a personal data assistant (PDA).

3. The mobile communication device of claim 1, wherein the optical transmitter is further configured to send the series of first quantum signals to the relay by using a free-space optical communication.

4. The mobile communication device of claim 1, wherein the processor is further configured to:
    generate a series of secret keys based on a series of second quantum states randomly generated by the random number generator; and
    determine the quantum signal values of the series of first quantum signals based on the series of secret keys.

5. The mobile communication device of claim 1, wherein the random number generator is further configured to randomly generate the quantum states by using a random number generator (RNG) including a quantum random number generator (QRNG).

6. A mobile communication device, comprising:
    a quantum signal generator configured to generate a series of first quantum signals by using a first quantum filter;
    an optical transmitter configured to send the series of first quantum signals to a relay, the series of first quantum signals passing through a first quantum channel between the mobile device and the relay, and at least a part of the series of first quantum signals passing through a second quantum channel between the relay and a server and reaching the server,
        wherein a series of second quantum signals is generated such that the at least the part of the series of first quantum signals pass through a second quantum filter at the relay and transferred to the server via the second quantum channel,
        wherein information of the second filter is generated at the server and is transferred to the relay via a non-quantum channel, and
        wherein at least a part of the series of first quantum signals directly passes through the second quantum channel and reaches the server; and
    a processor configured to:
        select the first quantum filter based on a series of randomly generated first quantum states;
        control the quantum signal generator to generate the series of first quantum signals by using the first through the second quantum filter;
        randomly generate the series of first quantum states based on random numbers;
        receive information of the second quantum filter from the relay or the server via the non-quantum channel;
        send information of the first quantum filter to the relay via the non-quantum channel;
        generate a secret key in conjunction with the relay based on the information of the first quantum filter and the information of the second quantum filter; and
        perform user authentication in conjunction with the relay by using the secret key.

7. The mobile communication device of claim 6, wherein the mobile communication device is at least one of a mobile phone or a personal data assistant (PDA).

8. The mobile communication device of claim 6, wherein the optical transmitter is further configured to send the series of first quantum signals to the relay by using a free-space optical communication.

9. A quantum cryptography authentication method for a mobile communication device, the method comprising:
    generating, by a quantum signal generator, a series of first quantum signals by using a first quantum filter;
    transmitting, by an optical transmitter, the series of first quantum signals to a relay, the series of first quantum signals passing through a first quantum channel between the mobile device and the relay, and at least a part of the series of first quantum signals passing through a second quantum channel between the relay and a server and reaching the server, wherein a series of second quantum signals is generated such that the at least the part of the series of first quantum signals pass through a second quantum filter at the relay and transferred to the server via the second quantum channel, wherein information of the first quantum filter and the second quantum filter are transferred together to the server via a non-quantum channel, and wherein a series of third quantum signals is generated such that at least a part the series of second quantum signals pass through a third quantum filter at the server; and selecting, by a processor, the first quantum filter based on a series of randomly generated first quantum states; and controlling, by the processor, the quantum signal generator to generate the series of first quantum signals by using the first quantum filter, wherein the controlling comprises:

randomly generating the series of first quantum states based on random numbers;

receiving information of the second quantum filter from the relay and receiving information of the third quantum filter from the server, generating a first secret key in conjunction with the relay and the server by applying the information of the first quantum filter, the information of the second quantum filter, and the information of the third quantum filter to the series of first quantum signals; and performing user authentication in conjunction with the relay and the server by using the first secret key, wherein the first secret key is the same as a second secret key generated by the relay applying the information of the first quantum filter, the second quantum filter, and the third quantum filter to the series of second quantum signals, and wherein the first secret key is the same as a third secret key generated by the server applying the information of the first quantum filter, the second quantum filter, and the third quantum filter to the series of third quantum signals.

10. The quantum cryptography authentication method of claim 9, wherein the mobile communication device is at least one of a mobile phone or a personal data assistant (PDA).

11. The quantum cryptography authentication method of claim 9, wherein the transmitting the series of first quantum signals comprises transmitting the series of first quantum signals to the relay by using a free-space optical communication.

12. The quantum cryptography authentication method of claim 9, wherein:

the generating the first secret key and the generating the second comprise generating a series of secret keys based on a series of second quantum states randomly generated based on the random numbers; and the controlling comprises determining quantum signal values of the series of first quantum signals based on the series of secret keys.

13. The quantum cryptography authentication method of claim 9, wherein the randomly generating comprises randomly generating the quantum states by using a random number generator (RNG) including a quantum random number generator (QRNG).

14. A quantum cryptography authentication method for a mobile communication device, the method comprising:

generating, by a quantum signal generator, a series of first quantum signals by using a first quantum filter;

transmitting, by an optical transmitter, the series of first quantum signals to a relay, the series of first quantum signals passing through a first quantum channel between the mobile device and the relay, and at least a part of the series of first quantum signals passing through a second quantum channel between the relay and a server and reaching the server;

wherein a series of second quantum signals is generated such that the at least the part of the series of first quantum signals pass through a second quantum filter at the relay and transferred to the server via the second quantum channel, wherein information of the second filter is generated at the server and is transferred to the relay via a non-quantum channel, and wherein at least of a part of the series of first quantum signals directly passes through the second quantum channel and reaches the server;

selecting, by a processor, the first quantum filter based on a series of randomly generated first quantum states; and controlling the quantum signal generator to generate the series of first quantum signals by using the first quantum filter, wherein the controlling comprises:

randomly generating the series of first quantum states based on random numbers;

receiving information of the second quantum filter from the relay or the server via the non-quantum channel;

sending information of the first quantum filter to the relay via the non-quantum channel;

generating a secret key in conjunction with the relay based on the information of the first quantum filter and the information of the second quantum filter; and performing user authentication in conjunction with the relay by using the secret key.

15. The quantum cryptography authentication method of claim 14, wherein the mobile communication device is at least one of a mobile phone or a personal data assistant (PDA).

16. The quantum cryptography authentication method of claim 14, wherein the transmitting the series of first quantum signals to the relay comprises transmitting the series of first quantum signals to the relay by using a free-space optical communication.

* * * * *